(12) United States Patent
Kim et al.

(10) Patent No.: US 9,001,887 B2
(45) Date of Patent: *Apr. 7, 2015

(54) DOUBLE REGISTER ARRAY BUFFER FOR MOTION COMPENSATION (71) Applicant: Samsung Electronics Co., Ltd., Suwon-si (KR)

(72) Inventors: Doo-Hyun Kim, Seoul (KR); Hyun-Sang Park, Cheonan-si (KR); Si-hwa Lee, Seoul (KR); Do-hyung Kim, Haeseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,835

(22) Filed: Aug. 5, 2013

(65) Prior Publication Data

US 2013/0315318 A1 Nov. 28, 2013

Related U.S. Application Data (63) Continuation of application No. 11/905,369, filed on Sep. 28, 2007, now Pat. No. 8,526,493.

(30) Foreign Application Priority Data

Nov. 1, 2006 (KR) .................. 10-2006-0107495

(51) Int. Cl.
H04N 7/12 (2006.01)
H04N 19/23 (2014.01)
H04N 19/43 (2014.01)
H04N 19/433 (2014.01)

(52) U.S. Cl.
CPC ............. H04N 19/004 (2013.01); H04N 19/23 (2014.01); H04N 19/43 (2014.01); H04N 19/433 (2014.01)

(58) Field of Classification Search
USPC ............ 375/240.01, 240.02, 240.24; 370/412
See application file for complete search history.

(56) References Cited

U.S. PATENT DOCUMENTS 4,387,365 A * 6/1983 Berry et al. .................. 708/442
5,276,519 A * 1/1994 Richards et al. ............. 348/241
5,386,425 A * 1/1995 Kim .............................. 714/755

(Continued)

FOREIGN PATENT DOCUMENTS

JP 5-265686 10/1993
KR 10-2004-0048006 6/2004

OTHER PUBLICATIONS

US Notice of Allowance issued May 6, 2013 in copending U.S. Appl. No. 11/905,369.

(Continued)

Primary Examiner — Ricky Ngo
Assistant Examiner — Christine Ng
(74) Attorney, Agent, or Firm — Harness, Dickey & Pierce, P.L.C.

(57) ABSTRACT

Provided are a method and apparatus for buffering image data for motion compensation. One of two buffers of a double register array buffer, i.e., a first buffer, is selected as a buffer in which data corresponding to a row of a block of an image is to be written and the other of the double register array buffer is selected as a buffer from which data corresponding to another row of the block is to be read, thereby speeding up motion compensation processing when compared with the use of a single register array buffer.

6 Claims, 9 Drawing Sheets (56) References Cited

U.S. PATENT DOCUMENTS

| | | | |
|---|---|---|---|
| 5,412,740 A * | 5/1995 | Fadavi-Ardekani | 382/293 |
| 5,563,623 A * | 10/1996 | Barrett, Jr. | 345/98 |
| 5,929,832 A * | 7/1999 | Furukawa et al. | 345/98 |
| 6,031,546 A * | 2/2000 | Shimizu | 345/656 |
| 6,262,748 B1 | 7/2001 | Deering et al. | |
| 6,384,634 B1 * | 5/2002 | Brissette et al. | 326/93 |
| 6,707,463 B1 * | 3/2004 | Gibson et al. | 345/619 |
| 6,765,579 B2 * | 7/2004 | Champion | 345/531 |
| 6,922,210 B2 * | 7/2005 | Yang et al. | 348/308 |
| 7,092,360 B2 | 8/2006 | Saint-Hilaire et al. | |
| 7,529,746 B2 | 5/2009 | Ichiriu et al. | |
| 8,526,493 B2 * | 9/2013 | Kim et al. | 375/240.02 |
| 2003/0021346 A1 * | 1/2003 | Bixby et al. | 375/240.25 |
| 2003/0117416 A1 * | 6/2003 | Danielsen et al. | 345/606 |

OTHER PUBLICATIONS

US Office Action issued Feb. 27, 2013 in copending U.S. Appl. No. 11/905,369.

US Office Action issued Sep. 13, 2012 in copending U.S. Appl. No. 11/905,369.

US Advisory Action issued Feb. 7, 2012 in copending U.S. Appl. No. 11/905,369.

US Office Action issued Nov. 22, 2011 in copending U.S. Appl. No. 11/905,369.

US Office Action issued Jun. 7, 2011 in copending U.S. Appl. No. 11/905,369.

U.S. Appl. No. 11/905,369, filed Sep. 28, 2007, Doo-Hyun Kim, et al., Samsung Electronics Co., Ltd.

* cited by examiner

ONE REGISTER ARRAY BUTTER

| Current State | | | | Next State (Non-padding Condition) | | | | Next State (Padding condition) | | | |
|---|---|---|---|---|---|---|---|---|---|---|---|
| BC[1] | BC[0] | EOW | EOR | BC[3] | BC[2] | BC[1] | BC[0] | BC[3] | BC[2] | BC[1] | BC[0] |
| 0 | 0 | 0 | 0 | 0 | 0 | 0 | 0 | 0 | 0 | 0 | 0 |
| | | 0 | 1 | X | X | X | X | X | X | X | X |
| | | 1 | 0 | WBF | !WBF | WBF | !WBF | WBF | !WBF | WBF | !WBF |
| | | 1 | 1 | X | X | X | X | X | X | X | X |
| 0 | 1 | 0 | 0 | 0 | 1 | 0 | 1 | 0 | 1 | 0 | 1 |
| | | 0 | 1 | 0 | 0 | 0 | 0 | 0 | 1 | 0 | 1 |
| | | 1 | 0 | 1 | 1 | 1 | 1 | 0 | 1 | 1 | 1 |
| | | 1 | 1 | 1 | 0 | 1 | 0 | 1 | 1 | 1 | 1 |
| 1 | 0 | 0 | 0 | 0 | 0 | 0 | 0 | 1 | 0 | 1 | 0 |
| | | 0 | 1 | 0 | 0 | 0 | 0 | 1 | 0 | 1 | 0 |
| | | 1 | 0 | 1 | 1 | 1 | 1 | 1 | 0 | 1 | 1 |
| | | 1 | 1 | 0 | 1 | 0 | 1 | 1 | 0 | 1 | 1 |
| 1 | 1 | 0 | 0 | BC[3] | BC[2] | 1 | 1 | BC[3] | BC[2] | 1 | 1 |
| | | 0 | 1 | !BC[3] | !BC[2] | !BC[3] | !BC[2] | BC[3] | BC[2] | 1 | 1 |
| | | 1 | 0 | X | X | X | X | X | X | X | X |
| | | 1 | 1 | X | X | X | X | X | X | X | X |

BC[3] : Reading state of second buffer
BC[2] : Reading state of first buffer
BC[1] : Fullness state of second buffer
BC[0] : Fullness state of first buffer
WBF:Write buffer flag, 0    first buffer writing, 1    second buffer writing

DOUBLE REGISTER ARRAY BUFFER FOR MOTION COMPENSATION

CROSS-REFERENCE TO RELATED PATENT APPLICATION

This application is a Continuation of U.S. patent application Ser. No. 11/905,369, filed on Sep. 28, 2007, the disclosure of which is incorporated herein in its entirety by reference. This application claims the priority benefit of Korean Patent Application No. 10-2006-0107495, filed on Nov. 1, 2006, in the Korean Intellectual Property Office, the disclosure of which is incorporated herein in its entirety by reference.

BACKGROUND OF THE INVENTION

1. Field of the Invention

The present invention relates to a method and apparatus for buffering image data for motion compensation.

2. Description of the Related Art

Platforms for playing multimedia data such as video contents usually have a separate hardware accelerator therein. In particular, such a separate hardware accelerator is indispensable to a video codec because intensive data processing is required in the video codec. A motion compensation part of a video codec consumes the most amount of time in the video codec. In a video codec, the motion compensation part most frequently accesses data stored in a memory.

Thus, a majority of hardware accelerators include motion compensation parts. In order for a hardware accelerator to access data stored in a memory for motion compensation, several factors should be taken into account, such as an access unit and padding.

In general, most buses such as an advanced microprocessor bus architecture (AMBA) transmit data in units of 32 bits, and pixel data used for motion compensation is 8-bit data that is not memory-aligned. Thus, in order to improve the efficiency of a bus, 32-bit data has to be read in and data required for motion compensation has to be selected out of the read-in data in units of 8 bits. In all video codec standards, data for motion compensation can be accessed even when the current image deviates from a reference image. For data outside the range of the reference image, the values of pixels in the boundary portion of the reference image are used, which is called "padding". The following two schemes are most widely used to implement a motion compensation part with hardware based on the two considerations.

First, a synchronous random access memory (SRAM) buffer is used as a buffer for motion compensation. In other words, in this scheme, data that has to be read by a motion compensation processor is previously placed in a provided separate SRAM buffer and then data stored in the SRAM buffer is used by the motion compensation processor after being padded if padding is necessary. However, according to this scheme, the size of hardware increases due to the separate SRAM buffer and the speed of motion compensation decreases because operations for motion compensation begin only after data of an entire block is stored in the SRAM buffer.

Second, a first-in first-out (FIFO) module based on one register array buffer is used as a buffer for motion compensation. In this scheme, 32-bit data is input and then is output as 8-bit data after being padded. The FIFO module uses a buffer formed by a combination of registers corresponding to the maximum width of a block for motion compensation, i.e., a single register array buffer. However, according to this scheme, the buffer is quickly filled up because 8 bits are output for 32-bit input data. Since new data cannot be input to the buffer until the remaining data of the buffer is completely output, the speed of motion compensation decreases.

SUMMARY OF THE INVENTION

The present invention provides a method and apparatus, by which the size of hardware used for motion compensation can be reduced by using a double register array buffer instead of a synchronous random access memory (SRAM), and the speed of motion compensation processing can be increased by using the double register array buffer instead of a single register array buffer, and a computer-readable recording medium having recorded thereon a program for executing the method on a computer.

According to an aspect of the present invention, there is provided a buffering method including (a) selecting a first buffer from at least two buffers as a buffer in which data corresponding to a row of a block of an image is to be written; (b) selecting a second buffer from the at least two buffers as a buffer from which data corresponding to another row of the block of the image is to be read; and (c) writing the data corresponding to the row of the block of the image in the first buffer and outputting the data corresponding to the other row of the block of the image stored in the second buffer according to the selections made in (a) and (b).

According to another aspect of the present invention, there is provided a computer-readable recording medium having recorded thereon a program for executing a buffering method on a computer, the buffering method including (a) selecting a first buffer from at least two buffers as a buffer in which data corresponding to a row of a block of an image is to be written; (b) selecting a second buffer from the at least two buffers as a buffer from which data corresponding to another row of the block of the image is to be read; and (c) writing the data corresponding to the row of the block of the image in the first buffer and outputting the data corresponding to the other row of the block of the image stored in the second buffer according to the selections made in (a) and (b).

According to another aspect of the present invention, there is provided a buffer including a write finite state machine (FSM) selecting a first buffer from at least two buffers as a buffer in which data corresponding to a row of a block of an image is to be written; a read FSM selecting a second buffer from the at least two buffers as a buffer from which data corresponding to another row of the block of the image is to be read; and a first-input first-out (FIFO) module writing the data corresponding to the row of the block of the image in the first buffer and outputting the data corresponding to the other row of the block of the image stored in the second buffer according to the selections made by the write FSM and the read FSM.

BRIEF DESCRIPTION OF THE DRAWINGS

The above and other features and advantages of the present invention will become more apparent by describing in detail an embodiment thereof with reference to the attached drawings in which.

DETAILED DESCRIPTION OF THE INVENTION

Hereinafter, exemplary embodiments of the present invention will be described in detail with reference to the accompanying drawings.

In the following embodiments of the present invention, a double register array-type first-in first-out (FIFO) module is used for motion compensation. This is because the size of hardware used for motion compensation can be reduced by using a double register array-type FIFO module instead of a synchronous random access memory (SRAM). Also, the speed of motion compensation processing can be increased by using a double register array-type FIFO instead of a single buffer. This scheme has not been used due to complexity caused by control over two buffers as well as padding. In the following embodiments of the present invention, efficient padding and a buffer control method corresponding thereto will be suggested.

Figure 1:
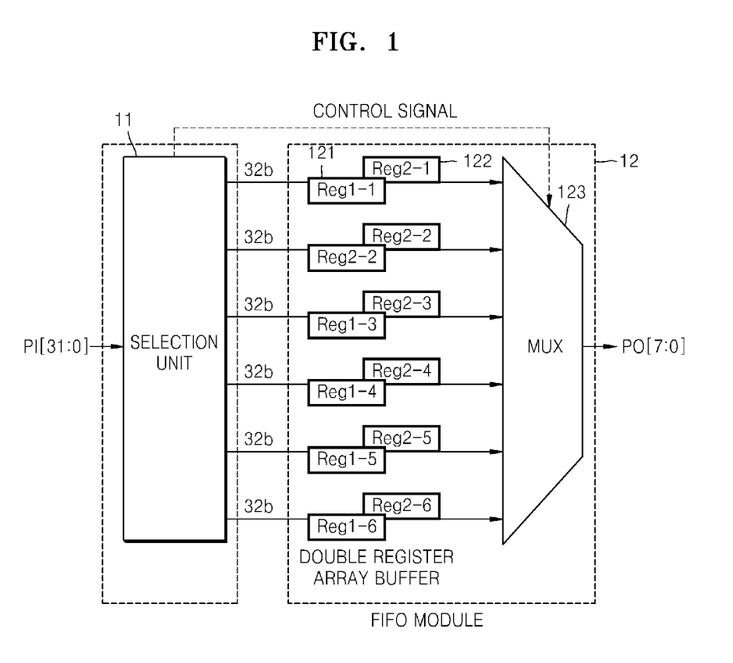
FIG. 1 illustrates the structure of a double register array buffer according to an embodiment of the present invention.

FIG. 1 illustrates the structure of a double register array buffer according to an embodiment of the present invention.

Referring to FIG. 1, the double register array buffer according to the current embodiment of the present invention includes a selection unit 11 and a first-in first-out (FIFO) module 12.

The selection unit 11 receives data in units of 32 bits from an external device, e.g., a memory. The selection unit 11 selects one of two buffers 121 and 122 included in the double register array buffer as a buffer to which data corresponding to a row of a block of an input image is to be written. In particular, according to the current embodiment of the present invention, the selection unit 11 selects a buffer corresponding to the generated address as the buffer in which the data is to be written by generating an address of a register in which data in 32-bit units is to be written. Each of the registers of the double register array buffer can store 32-bit data.

The selection unit 11 also selects the other of the two buffers 21 and 22 as a buffer from which data corresponding to another row of the block of the input image is to be read. In particular, according to the current embodiment of the present invention, the selection unit 11 selects a buffer corresponding to the generated address as the buffer from which the data is to be read by generating an address of a register in which data in 8-bit units is written in order to be read by an external device, e.g., a motion compensation processor. The external device reads out data in 8-bit units from each of the 32-bit registers of the double register array buffer.

Referring to FIG. 1, the FIFO module 12 includes a first buffer 121 composed of a register array including 6 registers Reg1-1-1-6, a second buffer 122 composed of a register array including 6 registers Reg2-1-2-6, and a multiplexer 123. Each of the registers Reg1-1-1-6 of the first buffer 121 and the registers Reg2-1-2-6 of the second buffer 122 stores 32-bit data. In particular, according to the current embodiment of the present invention, the FIFO module 12 uses one of the first buffer 121 and the second buffer 122 as an input buffer and uses the other as an output buffer. If the selection unit 11 wrongly controls the first buffer 121 and the second buffer 122, an input register and an output register may collide and thus a wrong value may be output.

More specifically, the FIFO module 12 receives data in units of 32 bits from the selection unit 11, writes input data in 32-bit units in a buffer selected by the selection unit 11 as a buffer in which data is to be written, and outputs, in units of 8 bits, data stored in a buffer selected by the selection unit 11 as a buffer from which data is to be read. In particular, the multiplexer 123 determines which one of the 12 registers of the double register array buffer data is to be output from.

Figure 2:
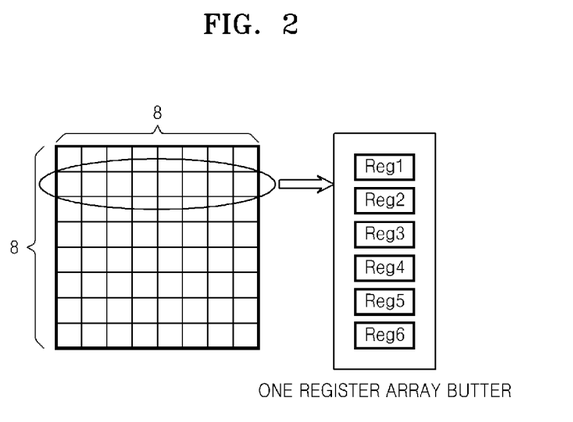
FIG. 2 illustrates a state in which data corresponding to a row of an 8×8 block is written to the double register array buffer illustrated in FIG. 1, according to an embodiment of the present invention.

FIG. 2 illustrates a state in which data corresponding to a row of an 8×8 block is written to the double register array buffer illustrated in FIG. 1, according to an embodiment of the present invention.

Referring to FIG. 2, if the 8×8 block has been used for motion compensation, the FIFO module 12 writes data corresponding to a row of the 8×8 block in one of the first and second buffers 121 and 122. In particular, since the first and second buffers 121 and 122 are used in the current embodiment of the present invention, upon finishing writing the data corresponding to the row in the first buffer 121, the FIFO module 12 writes data corresponding to another row following the row in the second buffer 122.

Figure 3:
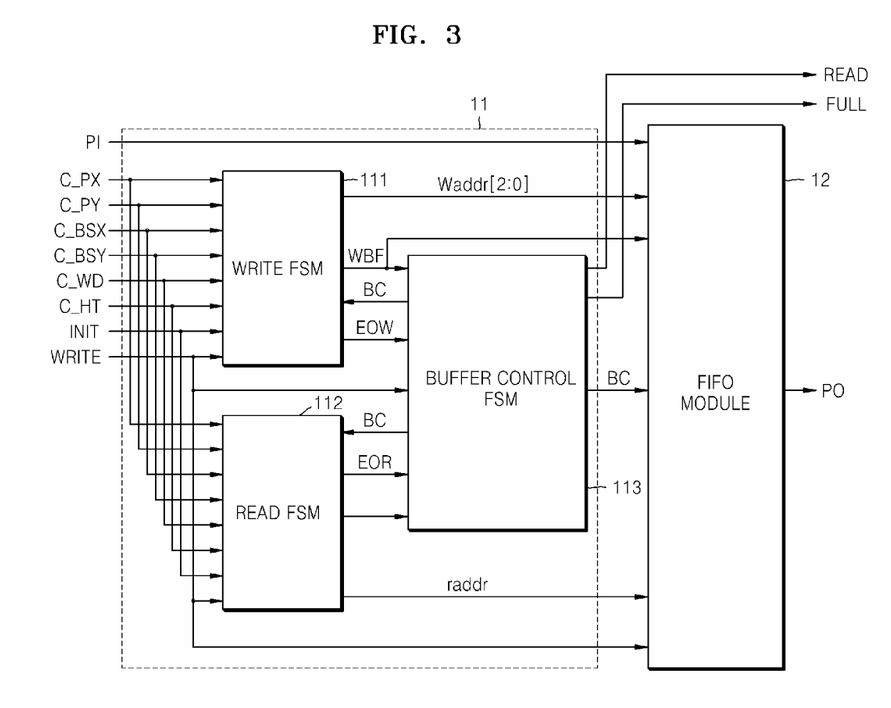
FIG. 3 illustrates the detailed structure of a selection unit of the double register array buffer illustrated in FIG. 1, according to an embodiment of the present invention.

FIG. 3 illustrates a detailed structure of the selection unit 11 of the double register array buffer illustrated in FIG. 1, according to an embodiment of the present invention.

Referring to FIG. 3, the selection unit 11 includes a finite state machine (FSM) 111, a read FSM 112, and a buffer control FSM 113. The write FSM 111 controls input data and the read FSM 112 controls output data. The buffer control FSM 113 controls the first buffer 121 and the second buffer 122.

The write FSM 111 receives a horizontal-direction value C_PX of a motion vector, a vertical-direction value C_PY of the motion vector, a horizontal-size value C_BSX of a block that is a unit of motion compensation processing, a vertical-size value C_BSY of the block, a horizontal-size value C_WD of an image that is subject to motion compensation, a vertical-size value C_HT of the image, an initialization signal INIT indicating initialization of the double register array buffer, and a write signal WRITE indicating that data to be written in the double register array buffer is loaded in a 32-bit data bus from an external device, e.g., a motion compensation processor. Herein, C_BSX and C_BSY indicate the size values of the block based on interpolation between pixels of the image.

The write FSM 111 recognizes the size of the image based on the input horizontal-size value C_WD and the vertical-size value C_HT. The write FSM 111 also recognizes the size of the block based on the input horizontal-size value C_BSX and the vertical-size value C_BSY. The write FSM 111 also recognizes the amount of horizontal motion of a current image relative to a reference image based on the input horizontal-direction value C_PX and determines the amount by which the current image deviates from the reference image in the horizontal direction based on the recognized amount of motion within the recognized image size. The write FSM 111 determines how much data of a row of a block of the reference image, i.e., a row of the block corresponding to the input horizontal-size value C_BSX, is valid as data of the current image based on the determination. When the write FSM 111 finishes writing data corresponding to the determined amount, it updates a signal End-Of-Write (EOW) indicating a data write complete state of a buffer as a value indicating a data write operation for a row of a block has been completed, and outputs the updated signal EOW to the buffer control FSM 113.

The write FSM 111 also recognizes the amount of vertical motion of the current image relative to the reference image based on the input vertical-direction value C_PY and determines the amount by which the current image deviates from the reference image in the vertical direction based on the recognized amount of motion within the recognized image size. The write FSM 111 also determines how much data of a column of a block of the reference image, i.e., a column of the block corresponding to the input vertical-size value C_BSY, is valid as data of the current image based on the determination. When the write FSM 111 finishes writing data corresponding to the determined amount, it updates a signal End-Of-Block (EOB) indicating a data write complete state of the entire block as a value indicating that a data write operation for the entire block has been completed.

If the input initialization signal INIT is valid, the write FSM 111 initializes the double register array buffer. During the valid period of an input write signal, the write FSM 111 outputs an address waddr of a register in which data that is input in units of 32 bits from outside, e.g., a memory, is to be written to the FIFO module 12, outputs the signal EOW to the buffer control FSM 113, and outputs a signal WBF indicating which one of the first buffer 121 and the second buffer 122 is in a data write state to the FIFO module 12 and the buffer control FSM 113.

The write FSM 111 also receives a signal BC indicating the state of each of the first buffer 121 and the second buffer 122 of the double register array buffer. Herein, the signal BC is composed of a total of 4 bits among which the value of a first bit indicates that data corresponding to a row of a block has been written in the first buffer 121, the value of a second bit indicates that data corresponding to a row of a block has been written in the second buffer 122, the value of a third bit indicates that data is being read from the first buffer 121, and the value of a fourth bit indicates that data is being read from the second buffer 122.

The write FSM 111 selects one of the first buffer 121 and the second buffer 122 as a buffer in which 32-bit data input from an external device is to be written based on the input signal BC and generates the address waddr for the selected buffer. In particular, the write FSM 111 generates the address waddr based on the determined amount by which the current image deviates from the reference image in the horizontal direction. For example, in the H.264 standard, the amount of data of a row of a block is specified as 21 bytes, i.e., a total of 21×8=168 bits. When the current image falls within the reference image in the horizontal direction, data of a row of a block is written in all the six 32-bit registers of one of the first buffer 121 and the second buffer 122. However, when the current image deviates from the reference image in the horizontal direction, data that is to be read from a row of the reference image disappears by the amount by which the current image deviates from the reference image and thus it is not necessary to write data in all the six 32-bit registers. As a result, in this case, the number of addresses waddr to be generated is reduced.

The read FSM 112 receives the horizontal-direction value C_PX, the vertical-direction value C_PY, the horizontal-size value C_BSX, the vertical-size value C_BSY, the horizontal-size value C_WD, the vertical-size value C_HT, and the initialization signal INIT from outside. The read FSM 112 also recognizes the size of the image based on the input horizontal-size value C_WD and vertical-size value C_HT. The read FSM 112 also recognizes the amount of horizontal motion of the current image relative to the reference image and determines the amount by which the current image deviates from the reference image in the horizontal direction based on the recognized amount of motion within the recognized image size. The read FSM 112 also determines how much data of a row of a block of the reference image, i.e., a row of the block corresponding to the input horizontal-size value C_BSX, is valid as data of the current image based on the determination. When the write FSM 111 finishes reading data corresponding to the determined amount, it updates a signal End-Of-Read (EOR) as a value indicating that a data read operation for a row of a block has been completed and outputs the updated signal EOR to the buffer control FSM 113.

The read FSM 112 also recognizes the amount of vertical motion of the current image relative to the reference image based on the input vertical-direction value C_PY and determines the amount by which the current image deviates from the reference image in the vertical direction based on the recognized amount of motion within the recognized image size. The read FSM 112 also determines how much data of a column of a block of the reference image, i.e., a column of the block corresponding to the input vertical-size value C_BSY, is valid as data of the current image based on the determination. When the read FSM 112 finishes reading data corresponding to the determined amount, it updates a signal EOB as a value indicating that a data read operation for the entire block has been completed.

Figure 4:
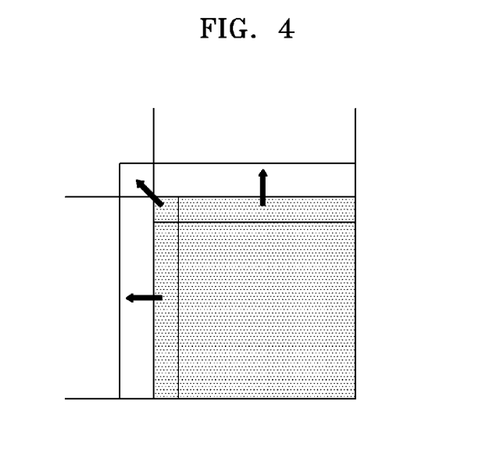
FIG. 4 is a diagram for explaining padding of pixel values when a current image deviates from a reference image.

FIG. 4 is a diagram for explaining padding of pixel values when a current image deviates from a reference image.

The padding scheme illustrated in FIG. 4 can be used in any video codec. According to this padding scheme, when the current image deviates above the reference image, the deviating portion of the current image is padded with the values of pixels located in the upper-most row of the reference image. When the current image deviates to the left of the reference image, the deviating portion of the current image is padded with the values of pixels located in the left-most column of the reference image. In other words, padding is performed using the values of pixels located in the boundary portion of the reference image. In particular, diagonal lines of the current image are padded with the values of pixels located in corners of the boundary portion of the reference image.

Figure 5:
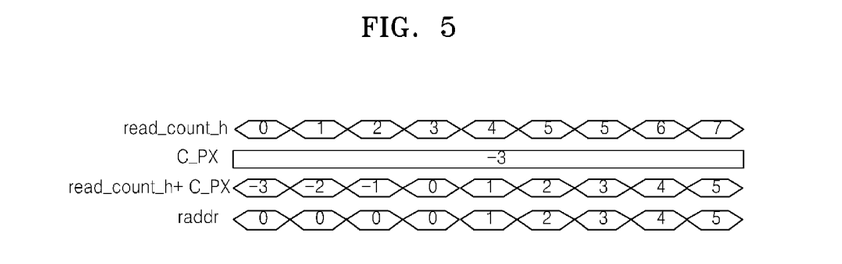
FIG. 5 is a diagram for explaining padding performed by a read finite state machine (FSM) of the selection unit illustrated in FIG. 3, according to an embodiment of the present invention.

FIG. 5 is a diagram for explaining padding performed by the read FSM 112 of the selection unit 11 illustrated in FIG. 3, according to an embodiment of the present invention.

Referring to FIG. 5, the read FSM 112 adds the input horizontal-direction value C_PX and a count read_count_h of one or more pixels that have been read from a row of a block in the horizontal direction, and determines whether a horizontal padding condition in the row is true based on the summation result. More specifically, the read FSM 112 determines that the condition is true if the summation result is less than 0 or greater than the input horizontal-size value C_WD and determines that the condition is not true if the summation result is not less than 0 or not greater than the input horizontal-size value C_WD.

If the read FSM 112 determines that the condition is not true in the row, it increases the count read_count_h by 1 and increases an address raddr of a register in which data that is to be currently read by an external device, e.g., a motion compensation processor, is written by 1, thereby sequentially outputting data in units of 8 bits from one of the first buffer 121 and the second buffer 122 of the double register array buffer. If the read FSM 112 determines that the condition is true in the row, it increases the count read_count_h by 1 and freezes the address raddr, thereby performing horizontal padding in the row. In other words, the read FSM 112 outputs the same pixel value from the row by incrementing the count read_count_h by 1 and freezing the address raddr, thereby performing horizontal padding.

The read FSM 112 also sums up the input vertical-direction value C_PY and a count read_count_v of one or more rows that have been read from a block, and determines whether a vertical padding condition in the block is true based on the summation result. More specifically, the read FSM 112 determines that the condition is true if the summation result is less than 0 or greater than the input vertical-size value C_HT and determines that the condition is not true if the summation result is not less than 0 or not greater than the input vertical-size value C_HT.

If the read FSM 112 determines that the condition is not true in the block, it increases the count read_count_v by 1 and removes data stored in a buffer from which a data read operation has been completed. If the read FSM 112 determines that the condition is true in the block, it increases the count read_count_v by 1 and freezes the data stored in the buffer from which the data read operation has been completed, thereby performing vertical padding in the block. In other words, the read FSM 112 outputs the data stored in the buffer for several columns by incrementing the count read_count_v by 1 and freezing the stored data, thereby performing vertical padding.

The buffer control FSM 113 receives the signal EOW and the signal WBF from the write FSM 111 and receives the signal EOR from the read FSM 112. The buffer control FSM 113 updates the signal BC based on the input signals EOW, WBF, and EOR and outputs the updated signal BC to the write FSM 111, the read FSM 112, and the FIFO module 12. In particular, the buffer control FSM 113 updates the signal BC based on a double register array buffer state table. Hereinafter, the double register array buffer state table will be described.

Figure 6:
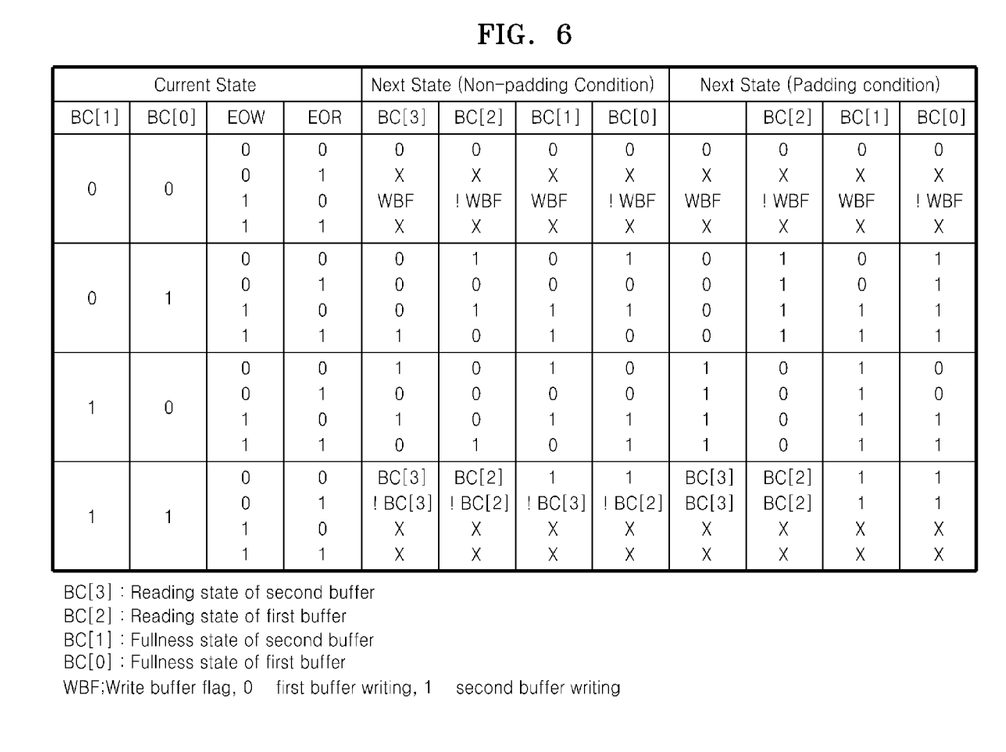
FIG. 6 illustrates a double register array buffer state table referred to by a buffer control FSM of the selection table illustrated in FIG. 3, according to an embodiment of the present invention.

FIG. 6 illustrates the double register array buffer state table referred to by the buffer control FSM 113 of the selection unit 11 illustrated in FIG. 3, according to an embodiment of the present invention.

Referring to FIG. 6, the double register array buffer state table defines next states BC[0], BC[1], BC[2], and BC[3] of the double register array buffer by combining current states BC[0] and BC[1] of the double register array buffer and the input signals EOW and EOR. To know the next state of the double register array buffer, four factors, i.e., a fullness state indicating whether a data write operation with respect to each of the first buffer 121 and the second buffer 122 has been completed, a reading state indicating whether an external device accesses each of the first buffer 121 and the second buffer 122, and the input signals EOW and EOR have to be known. 64 combinations can be made by the values of the four factors.

In the current embodiment of the present invention, the next state of the double register array buffer is defined only using the fullness state of each of the first buffer 121 and the second buffer 122 and the input signals EOW and EOR instead of using all the 64 combinations.

A buffer in which a data write operation has been completed cannot be immediately a buffer from which a data read operation is being performed, and may be the buffer from which the data read operation is being performed according to the input signal EOR. For example, if EOR=1 for BC[0]=1 and BC[1]=0, the next states of the double register array buffer become BC[0]=0, BC[1]=0, BC[2]=0, and BC[3]=0 when the horizontal padding condition is not true and become BC[0]=1, BC[1]=0, BC[2]=1, and BC[3]=0 when the horizontal padding condition is true.

In other words, the buffer control FSM 113 searches for the current states BC[0] and BC[1] corresponding to the input signals EOW and EOR in the double register array buffer state table and updates the next states BC[0], BC[1], BC[2], and BC[3] with values corresponding to next states of the found current states according to whether the horizontal padding condition is true.

The FIFO module 12 receives data in units of 32 bits from outside, e.g., a memory, receives the signal BC from the buffer control FSM 113, receives the address waddr and the signal WBF from the write FSM 111, and receives the address raddr from the read FSM 112. The FIFO module 12 also recognizes the state of each of the first buffer 121 and the second buffer 122 of the double register array buffer based on the input signal BC and signal WBF. The FIFO module 12 also writes input data in a register corresponding to the input address waddr based on the recognized state of each of the first buffer 121 and the second buffer 122 and outputs data stored in a register corresponding to the input address raddr in units of 8 bits.

Figure 7:
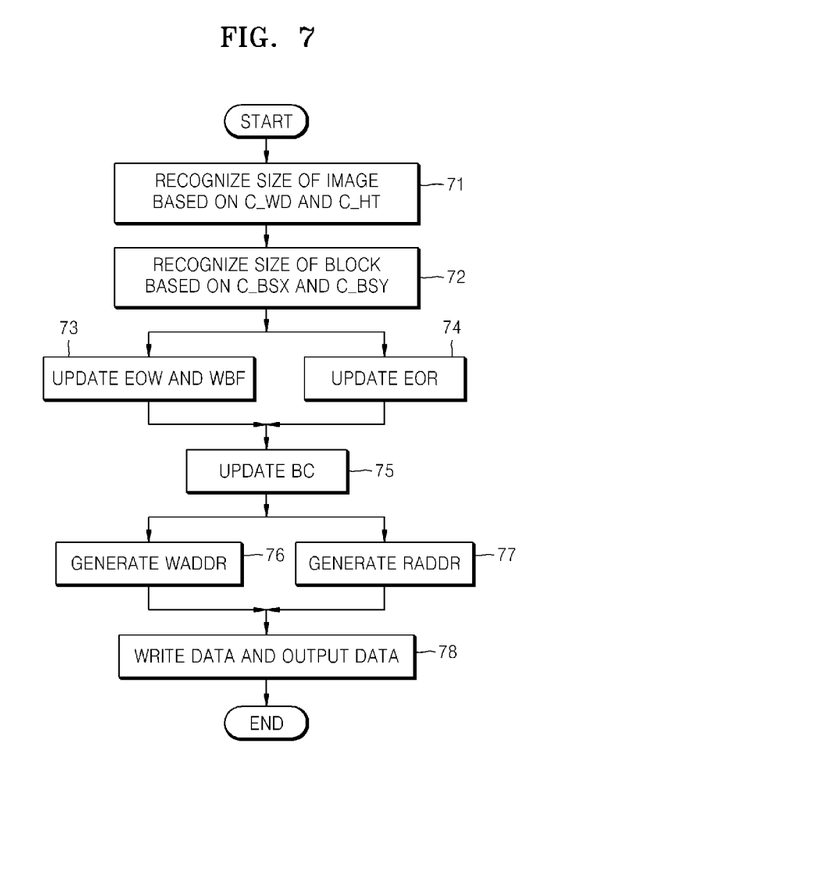
FIG. 7 is a flowchart illustrating a buffering method according to an embodiment of the present invention.

FIG. 7 is a flowchart illustrating a buffering method according to an embodiment of the present invention.

Referring to FIG. 7, the buffering method according to the current embodiment of the present invention includes operations that are time-serially processed by the double register array buffer illustrated in FIGS. 1 and 3. Thus, the foregoing description regarding the double register array buffer illustrated in FIGS. 1 and 3 is applied to the buffering method according to the current embodiment of the present invention even if some portions of the foregoing description are omitted. However, it can be easily understood by those of ordinary skill in the art that the following operations are only some of several operations that are time-serially processed by the double register array buffer illustrated in FIGS. 1 and 3 and thus other combinations of the operations can also be derived.

Referring to FIG. 7, in operation 71, the double register array buffer recognizes the size of an image that is subject to motion compensation based on the horizontal-size value C_WD and the vertical-size value C_HT of the image, which are input from outside.

In operation 72, the double register array buffer recognizes the size of a block that is a unit of motion compensation processing based on the horizontal-size value C_BSX and the vertical-size value C_BSY of the block, which are input from outside.

In operation 73, the double register array buffer updates the signals EOW and WBF.

In operation 74, the double register array buffer updates the signal EOR.

In operation 75, the double register array buffer updates the signal BC based on the signals EOW, WBF, and EOR updated in operations 73 and 74.

Figure 8:
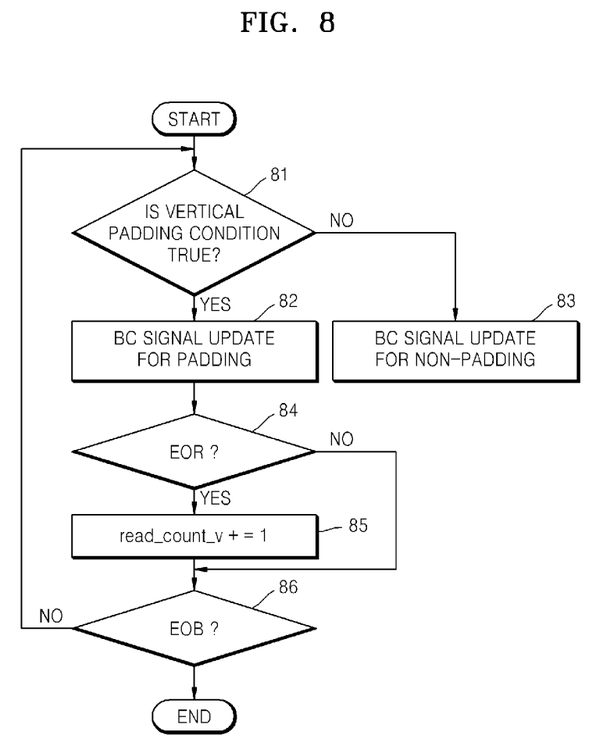
FIG. 8 is a detailed flowchart illustrating a BC update process for vertical padding in a BC update operation of the buffering method of FIG. 7, according to an embodiment of the present invention.

FIG. 8 is a detailed flowchart illustrating a BC update process for vertical padding in a BC update operation corresponding to operation 75 of the buffering method of FIG. 7, according to an embodiment of the present invention.

Referring to FIG. 8, the BC update process for vertical padding in the BC update operation corresponding to operation 75 includes the following operations.

In operation 81, the double register array buffer sums up the vertical-direction value C_PY and the count read_count_v that are input from outside and determines whether the vertical padding condition in the block is true based on the summation result. If the double register array buffer determines that the vertical padding condition is not true, it goes to operation 83. If the double register array buffer determines that the vertical padding condition is true, it goes to operation 82.

In operation 82, the double register array buffer updates the signal BC with a next state corresponding to the vertical padding condition.

In operation 84, the double register array buffer checks if the signal EOR is a value indicating that a data read operation for a row of the block has been completed. If so, the double register array buffer goes to operation 85. If not, the double register array buffer goes to operation 86.

In operation 85, the double register array buffer increases the count Read_count_v by 1. Even after the increase of the count read_count_v, the state of one of the first and second buffers 121 and 122 of the double register array buffer is frozen as a reading state according to the updated signal BC in operation 82 and is changed to a writing state from a reading state according to the updated signal BC in operation 83.

In operation 86, the double register array buffer checks if the signal EOB is a value indicating that a data read operation for the entire block has been completed. If so, the double register array buffer terminates its operation. If not, the double register array buffer goes back to operation 81.

In operation 76, the double register array buffer selects one of the first and second buffers 121 and 122 as a buffer in which 32-bit data input from outside is to be written based on the signal BC updated in operation 75, and generates the address waddr for the selected buffer.

Figure 9:
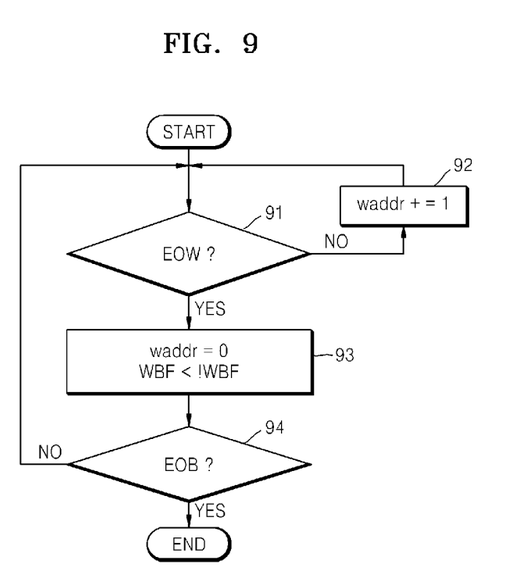
FIG. 9 is a detailed flowchart illustrating a waddr generation operation of the buffering method of FIG. 7, according to an embodiment of the present invention.

FIG. 9 is a detailed flowchart illustrating a waddr generation operation corresponding to operation 76 of the buffering method of FIG. 7, according to an embodiment of the present invention.

Referring to FIG. 9, the waddr generation operation corresponding to operation 76 of the buffering method of FIG. 7 includes the following operations.

In operation 91, the double register array buffer checks if the signal EOW is a value indicating that a data write operation for a row of the block has been completed. If so, the double register array buffer goes to operation 93. If not, the double register array buffer goes to operation 94.

In operation 92, the double register array buffer increases the address waddr by 1.

In operation 93, the double register array buffer sets the address waddr to 0 and inverts the value of the signal WBF, thereby preparing for a data write operation for data corresponding to another row.

In operation 94, the double register array buffer checks if the signal EOB is a value indicating that a data write operation for the entire block has been completed. If so, the double register array buffer terminates its operation. If not, the double register array buffer goes back to operation 91.

Referring back to FIG. 7, in operation 77, the double register array buffer selects one of the first and second buffers 121 and 122 as a buffer from which 8-bit data is to be read based on the signal BC updated in operation 75, and generates the address raddr for the selected buffer.

Figure 10:
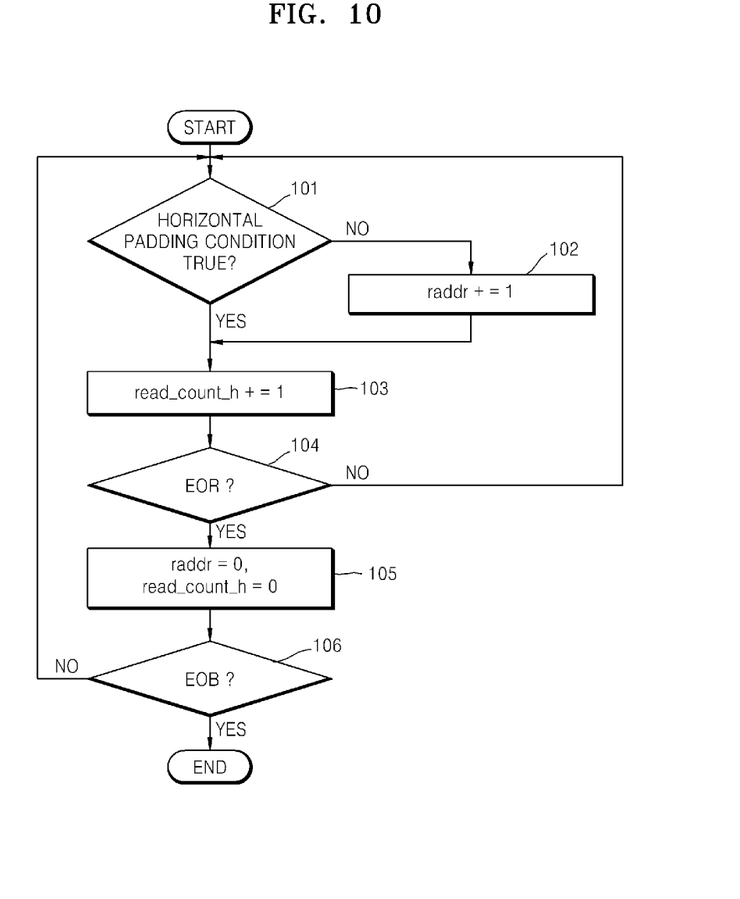
FIG. 10 is a detailed flowchart illustrating a raddr generation operation buffering method of FIG. 7, according to an embodiment of the present invention.

FIG. 10 is a detailed flowchart illustrating a raddr generation operation corresponding to operation 77 of the buffering method of FIG. 7, according to an embodiment of the present invention.

Referring to FIG. 10, the raddr generation operation corresponding to operation 77 of the buffering method of FIG. 7 includes the following operations.

In operation 101, the double register array buffer sums up the horizontal-direction value C_PX and the count read_count_h that are input from outside and determines whether the horizontal padding condition in the row is true based on the summation result. If the double register array buffer determines that the horizontal padding condition is not true, it goes to operation 102. If the double register array buffer determines that the horizontal padding condition is true, it goes to operation 103.

In operation 102, the double register array buffer increases the address raddr by 1, thereby sequentially outputting 8-bit data from one of the first and second buffers 121 and 122.

In operation 103, the double register array buffer increases the count read_count_h by 1.

In operation 104, the double register array buffer checks if the signal EOR is a value indicating that a data read operation for a row of the block has been completed. If so, the double register array buffer goes to operation 105. If not, the double register array buffer goes back to operation 101. In the latter, since the count read_count_h is increased without an increase in the address raddr, the address raddr is frozen.

In operation 105, the double register array buffer sets the address raddr to 0 and sets the count read_count_h to 0, thereby preparing for a data read operation for data corresponding to another row.

In operation 106, the double register array buffer checks if the signal EOB is a value indicating that a data write operation for the entire block has been completed. If so, the double register array buffer terminates its operation. If not, the double register array buffer goes back to operation 101.

Referring back to FIG. 7, in operation 78, the double register array buffer receives data in units of 32 bits, recognizes the state of each of the first and second buffers 121 and 122 of the double register array buffer based on the signals BC and WBF updated in operation 76, writes the input data in a register corresponding to the address waddr generated in operation 76 based on the recognized state of each of the buffers, and outputs, in units of 8 bits, data stored in a register corresponding to the address raddr generated in operation 77.

Meanwhile, the embodiments of the present invention can be written as computer programs and can be implemented in general-use digital computers that execute the programs using a computer readable recording medium. In addition, a data structure used in an embodiment of the present invention can be recorded on a computer-readable recording medium by various means.

Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

As described above, according to the present invention, one of two buffers of a double register array buffer, i.e., a first buffer, is selected as a buffer in which data corresponding to a row of a block of an image is to be written and the other of the buffers is selected as a buffer from which data corresponding to another row of the block is to be read, thereby speeding up motion compensation processing when compared with the use of a single register array buffer and doubling data buffering capacity. Moreover, according to the present invention, the size of hardware for motion compensation can be reduced by the non-requirement of an SRAM and the hardware for motion compensation can be easily implemented by defining an efficient FSM based on padding.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A buffering method comprising:
    selecting a first buffer from at least two buffers as a buffer in which data corresponding to a row of a block of an image is to be written;
    selecting a second buffer, corresponding to an address, from the at least two buffers as a buffer from which data corresponding to another row of the block of the image is to be read;
    selectively freezing the address to perform horizontal padding; and
    writing the data corresponding to the row of the block of the image in the first buffer and outputting the data corresponding to the other row of the block of the image stored in the second buffer according to the selections made.

2. The buffering method of claim 1, further comprising performing vertical padding by freezing the data stored in the second buffer.

3. The buffering method of claim 1, further comprising:
    receiving a signal indicating a fullness state of each of the first buffer and the second buffer and a signal End-Of-Write (EOW) indicating that a data write operation for a row of a block has been completed from a write Finite State Machine (FSM);
    receiving a signal End-Of-Read (EOR) indicating that a data read operation for a row of a block has been completed from a read FSM; and
    updating a signal Buffer Condition (BC) indicating the state of each of the first buffer and the second buffer based on the received signals, wherein the selecting of the first buffer and the selecting of the second buffer comprise the selecting the first buffer and the selecting the second buffer based on the updated signal BC.

4. A buffer comprising:
    a write finite state machine (FSM) selecting a first buffer from at least two buffers as a buffer in which data corresponding to a row of a block of an image is to be written;
    a read FSM selecting a second buffer, corresponding to an address, from the at least two buffers as a buffer from which data corresponding to another row of the block of the image is to be read and selectively freezing the address to perform horizontal padding; and
    a first-input first-out (FIFO) module writing the data corresponding to the row of the block of the image in the first buffer and outputting the data corresponding to the other row of the block of the image stored in the second buffer according to the selections made by the write FSM and the read FSM.

5. The buffer of claim 4, wherein the read FSM performs vertical padding by freezing the data stored in the second buffer.

6. The buffer of claim 4, further comprising a buffer control FSM
    receiving a signal indicating a fullness state of each of the first buffer and the second buffer and a signal End-Of-Write (EOW) indicating that a data write operation for a row of a block has been completed from the write FSM;
    receiving a signal End-Of-Read (EOR) indicating that a data read operation for a row of a block has been completed from the read FSM;
    updating a signal Buffer Condition (BC) indicating the state of each of the first buffer and the second buffer based on the received signals; and
    outputting the updated signal BC to the write FSM, the read FSM, and the FIFO module.

* * * * *